(12) United States Patent
Liu et al.

(10) Patent No.: US 9,489,916 B2
(45) Date of Patent: Nov. 8, 2016

(54) PROCESSING METHOD OF AN EXTERNAL-IMAGE DEVICE

(71) Applicant: Silicon Motion, Inc., Jhubei, Hsinchu County (TW)

(72) Inventors: Jin-Yun Liu, Shanghai (CN); Jun Chen, Shanghai (CN)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 362 days.

(21) Appl. No.: 13/970,800

(22) Filed: Aug. 20, 2013

(65) Prior Publication Data
US 2014/0055469 A1    Feb. 27, 2014

(30) Foreign Application Priority Data
Aug. 22, 2012    (CN) .......................... 2012 1 0300095

(51) Int. Cl.
*G09G 5/00* (2006.01)
*G06F 3/14* (2006.01)

(52) U.S. Cl.
CPC ................ *G09G 5/006* (2013.01); *G06F 3/14* (2013.01); *G06F 3/1415* (2013.01); *G06F 3/1454* (2013.01); *G09G 2350/00* (2013.01)

(58) Field of Classification Search
CPC .................... G09G 2310/04; G09G 2360/18; G09G 2320/103; G09G 2340/16; G09G 5/393; G06F 3/1454; G06F 3/14
See application file for complete search history.

(56) References Cited

U.S. PATENT DOCUMENTS

| 8,502,833 | B2 | 8/2013 | Tsai et al. |
| 2007/0146300 | A1 | 6/2007 | Wu et al. |
| 2012/0254645 | A1* | 10/2012 | Jeganathan et al. .......... 713/323 |
| 2013/0147832 | A1* | 6/2013 | Patel ............................ 345/619 |

FOREIGN PATENT DOCUMENTS

| TW | M338463 | 8/2008 |
| TW | 201123001 | 7/2011 |
| TW | 201216148 | 4/2012 |

OTHER PUBLICATIONS

English language machine translation of TW M338463 (published Aug. 11, 2008).
English language machine translation of TW 201123001 (published Jul. 1, 2011).
English language machine translation of TW 201216148 (published Apr. 16, 2012).

* cited by examiner

*Primary Examiner* — Jeffrey Chow
(74) *Attorney, Agent, or Firm* — McClure, Qualey & Rodack, LLP

(57) ABSTRACT

A processing method of an external-image device includes the following steps. A first number of basic area-updating requests are received, wherein each of the basic area-updating requests corresponds to an image-updating area. The first number of basic area-updating requests are generated by an electrical device and correspond to an updating content of a displayed image. The image-updating areas corresponding to the first number of basic area-updating requests are calculated to integrate the image-updating areas to a second number of transmission-image areas. The second number of transmission-image areas are transmitted to the external-image device through an external video adaptor.

8 Claims, 16 Drawing Sheets

PROCESSING METHOD OF AN EXTERNAL-IMAGE DEVICE

CROSS REFERENCE TO RELATED APPLICATION

This application claims priority of China Patent Application No. 201210300095.X filed on Aug. 22, 2012, the entirety of which is incorporated by reference herein.

BACKGROUND OF THE INVENTION

1. Field of the Invention

The present invention relates to processing methods and external-image devices, and in particular, to frame updating of an external-image device and the related processing method.

2. Description of the Related Art

Most electronic devices today employ displays. Sometimes, for the purpose of easy portability, the displays are made to be small, and they are installed in portable electronic devices such as netbooks, which are mainly used to surf the Internet; tablet PCs (personal computers); or mobile phones. Nowadays, the processing capability of portable electronic devices is greatly improved, and thus they can provide high-resolution images to be displayed on an external display via an output interface.

The external display may be any LCD (liquid-crystal display) monitor, as well as televisions, projectors, and the like. A typical interface being utilized to connect to the external display may be any DVI (digital visual interface), HDMI (High-Definition Multimedia Interface), Thunderbolt, or the like. Another typical way to connect to the external display is to provide an external video adaptor, in which one end connects to the portable electronic device and the other end connects to the external display, such that the images received from the portable electronic device are further processed and output to the external display.

Although it is convenient to output the image to an external device through the USB interface, the transmission rate of a USB interface is often limited such that the refresh rate of the external display is insufficient.

Thus, an efficient method of processing for the external-image device is needed in order to provide more convenience and efficiency to the user.

BRIEF SUMMARY OF INVENTION

A detailed description is given in the following embodiments with reference to the accompanying drawings.

An embodiment of a processing method of an external-image device is disclosed. The processing method of an external-image device comprises receiving a first number of basic area-updating requests, wherein each of the basic area-updating requests corresponds to an image area. The first number of basic area-updating requests are generated by an electrical device and correspond to an updating content of a displayed image. The image-updating areas corresponding to the first number of basic area-updating requests are calculated to integrate the image-updating areas to a second number of transmission-image areas. The second number of transmission-image areas are transmitted to the external-image device through an external interface.

In this embodiment, the first number can be greater than the second number. In addition, the plurality of basic area-updating requests can be integrated into a transmission-image area which corresponds to the updated result of the plurality of basic area-updating requests.

In this embodiment, the plurality of basic updating requests are generated by the operation system of an electrical device, and the processing method of the external-image device is performed by a driver of the electrical device. The driver is also responsible for transmitting the image to the external device through the external video adaptor.

Another embodiment further includes the steps of setting a predetermined period, and integrating the corresponding basic area-updating request to a corresponding transmission-image area.

The embodiment of the external video adaptor includes a USB transmission interface. When the updated images are sent to the external display, the updated images will be sent to an off-screen memory of the external-image device, then the content of the updated images is accessed through the external-image device to update the assessed content to corresponded area of the display image. This method is processed with the Bit Blit command.

In another embodiment of this invention, an external-image device corresponding to the processing method is disclosed.

In another embodiment of this invention, a processing method used for an electrical device and display is disclosed. The processing method of an external-image device comprises receiving a first number of basic area-updating requests, wherein each of the basic area-updating requests corresponds to an image area. The first number of basic area-updating requests are generated by an electrical device and correspond to an updating content of a displayed image. The image-updating areas corresponding to the first number of basic area-updating requests are calculated to integrate the image-updating areas to a second number of transmission-image areas according to the performance of the display.

In the past, each of the updated images trigged by the operation of the system that was directly sent to the external-image device and the local area must be sent column by column, such that the transmission rate was limited and the image was not smooth when the displayed image was updated. Through the embodiments above, a more effective way to transfer updated image data is provided.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1:
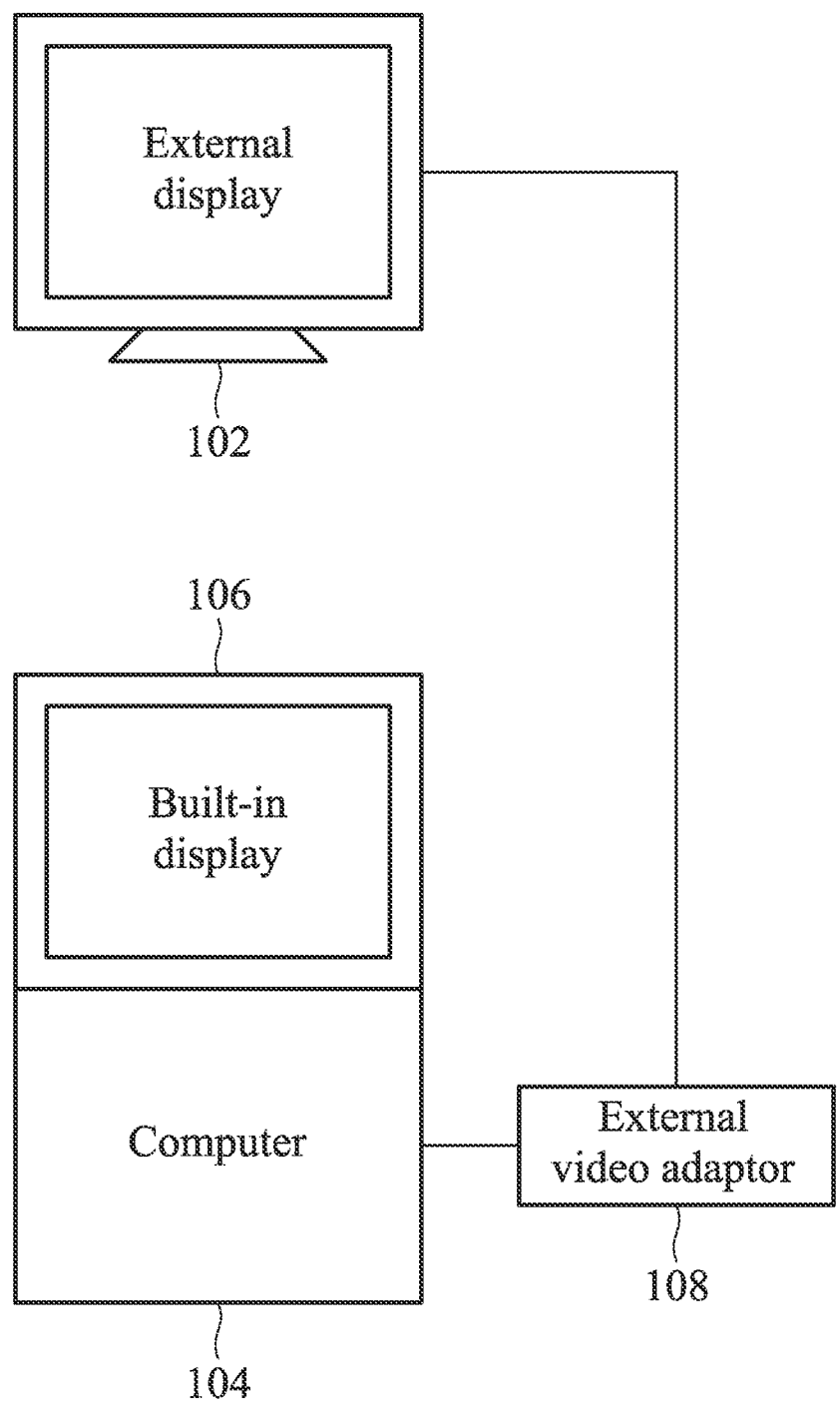
FIG. 1 is a diagram showing an embodiment of an external-image device of the invention.

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated and not drawn to scale for illustrative purposes. The dimensions and the relative dimensions do not correspond to actual dimensions to practice the invention.

Referring to FIG. 1, the system architecture of an embodiment of the invention is illustrated. The computer 104 comprises a built-in display 106, and couples or connects to an external display 102 via an external video adaptor 108. In the embodiment, the external video adaptor 108 couples or connects to the computer 104 via a USB (universal serial bus) interface, and couples or connects to the external display 102 via a DVI (digital visual interface) interface.

In the embodiment, the computer 104 may be a typical notebook computer. While the embodiment is described herein with respect to a notebook computer, it should be apparent that the disclosed implementations can be incorporated in, or integrated with, any electronic device that is capable of computing, including but not limited to a desktop computer, a multimedia player, a tablet PC, a mobile phone, etc.

In the embodiment as shown in FIG. 1, the computer 104 is equipped with a built-in display 106. Although the computer has been described having specific features, such as the built-in display, it should be apparent that the disclosed implementations may not necessarily provide it. For example, an optical disk player or a set-top box may only utilize the external display 102 as a main display.

Further, in this embodiment, the external video adaptor 108 is connected to the computer 104 as an external module. However, in other embodiments, the external video adaptor 108 is integrated into the computer 104 when the computer 104 serves as an external device of the external display 102. In some other implementations, those skilled in the art may install the external video adaptor 108 in the external display 102 as its entirety.

In the embodiment as shown in FIG. 1, the external display 102 has a display panel. While the embodiment is described herein with respect to a display having a display panel, it should be apparent that the disclosed implementations can be incorporated in, or integrated with, any electronic device that is capable of video processing, including but not limited to a projector or a video recorder capable of receiving image data and recording video or image streams, etc.

Figure 2:
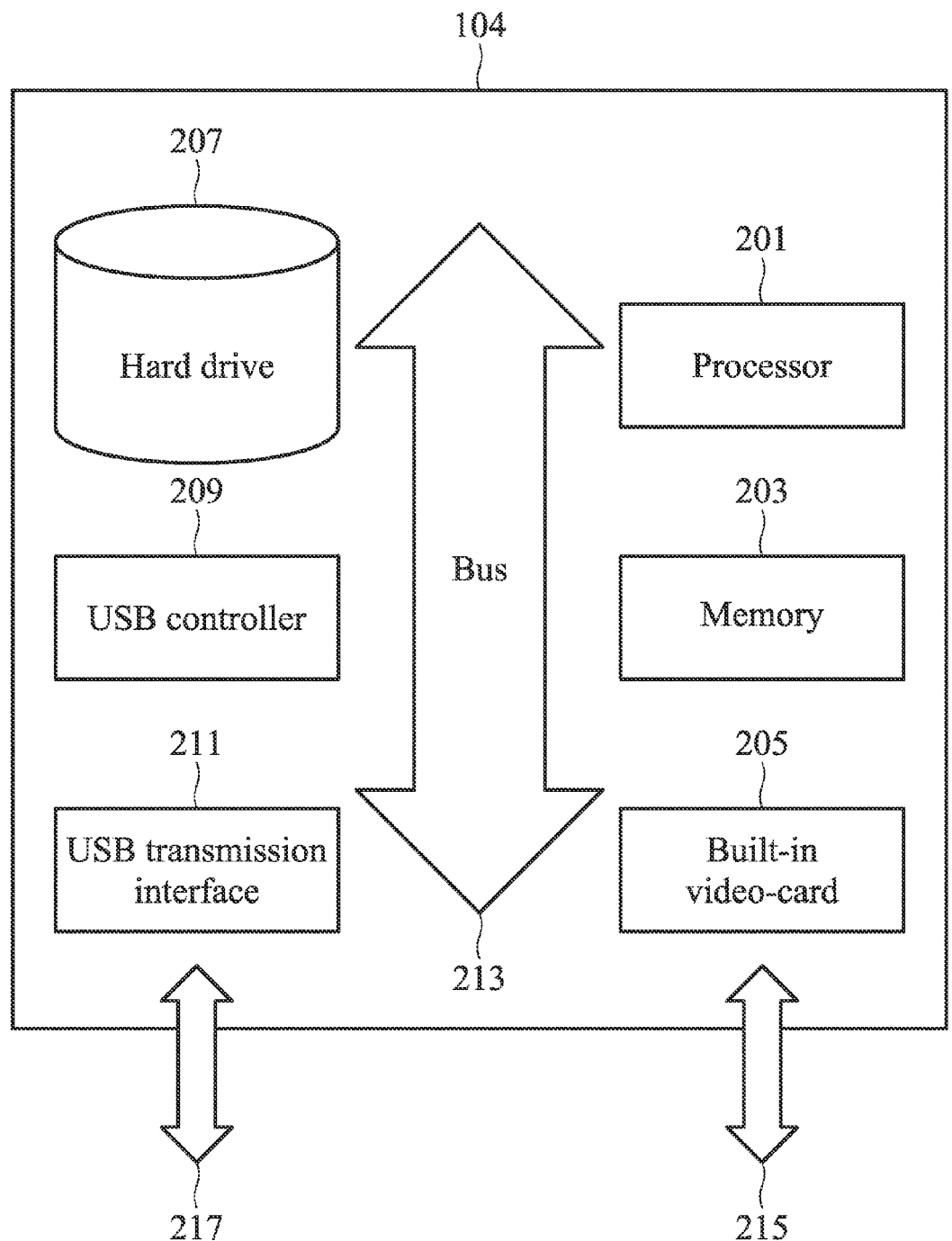
FIG. 2 is a diagram of another embodiment of the electrical device of the invention.

Referring to FIG. 2, FIG. 2 illustrates a schematic diagram of the computer 104 in FIG. 1.

As shown in FIG. 2, the computer 104 comprises a processor 201, a memory 203, a built-in video-card 205, a hard disk 207, a USB controller 209, and a USB transmission interface 211. The processor 201 loads program codes from the hard disk 207 to the memory 203 and executes a wide range of computing operations as required.

Typically, a portion of the computing operations comprise generating image data to be transmitted to the built-in video-card 205 via a bus 213. The built-in video-card 205 processes the image data to generate and transmit a corresponding image or video stream 215 to the built-in display 106 as shown in FIG. 1.

The processor 201 may determine if the external video adaptor 108 as shown in FIG. 1 has been coupled or connected to the USB controller 209 through the USB transmission interface 211. If so, the processor 201 generates the required image data in light of the read-out program code. The image data is transmitted to the USB transmission interface 211 via the bus 213 and is further transmitted to the external video adaptor 108 as shown in FIG. 1. The external video adaptor 108 processes the received image data, transforms the processed one into corresponding image streams, and further transmits the transformed one to the external display 102 for display.

While modules 201 to 217 are described in the computer 104, as shown in FIG. 2, it should be apparent that any of the modules 201 to 217 can be removed or replaced with another element based on different implementation requirements without departing from the spirit of the present invention. For example, it should be appreciated that, instead of the USB transmission interface 211, the peripheral interface may be a thunderbolt interface, a commonly used AV interface, a proprietary interface, etc. As mentioned above, while the embodiment is described herein with respect to the computer 104, it should be apparent that the disclosed implementations can be incorporated in, or integrated with, any electronic device that is capable of computing, including a mobile phone. If a mobile phone, all or a portion of the modules illustrated in FIG. 2 may be incorporated in an IC (integrated circuit) chip.

Figure 3:
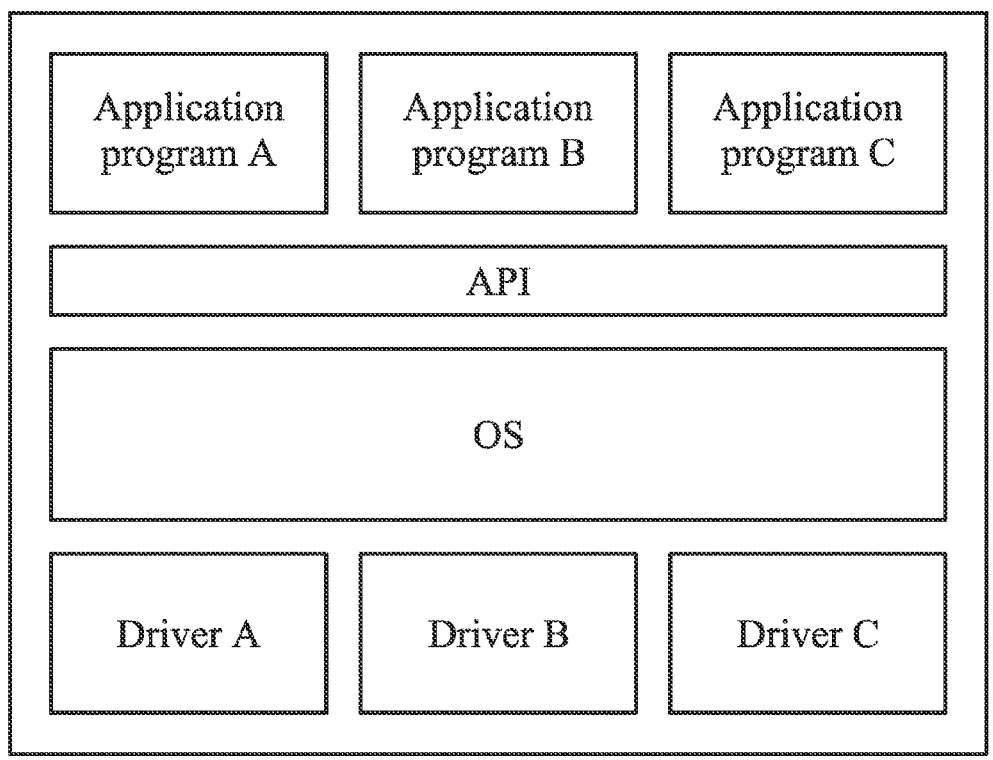
FIG. 3 is a diagram of another embodiment of the software structure of the invention.

Referring to FIG. 3, FIG. 3 illustrates a software structure of the computer 104 of FIG. 2.

In FIG. 3, an OS (operating system) is installed in the computer and communicates with a wide range of hardware modules through drivers A, B, and C. The OS also communicates with application programs A, B, and C through API (application-programming interface). By using this sort of software architecture, the computer 104 as shown in FIG. 1 can complete the designated tasks in order.

In the embodiment, the external video adaptor 108 may already be supported by the OS and the user has no need to install a corresponding driver—expending extra effort—in the computer 104. It should be appreciated that, in an alternative embodiment, in a situation in which the OS does not support the external video adaptor 108, it may need a corresponding driver to be installed by the user, such that the OS can know how to communicate with the external video adaptor 108.

For example, with usage of an interface provided by the OS, the external display 102 may be configured to display the same content as that shown on the built-in display 106, or the user may interact with the interface to configure the external display 102 to display different content from that shown on the built-in display 106 to display more information. It is also possible to configure it such that the external display 102 is dedicated to display the output of a particular application program, such as video-stream playback.

The driver may provide messages to the OS for further judgment and processing. However, the driver may handle part of the communications with the external video adaptor 108 and has no need to pass all messages to the OS depending on different design requirements.

In the detailed examples described below, a portion of the process of the external video adaptor 108, as required, may be handled by the corresponding driver.

The source code of the driver may be provided by the manufacturer of the external video adaptor 108 with an optical disk, downloaded from a particular web location by users, or delivered via other media. The driver source code may be written and distributed by a third party.

In the embodiment, the software, in the conceptual perspective, is separated by multiple modules in multiple layers. The above separation is not exhaustive, and it should be understood that those who are skilled in the art may modify the above-mentioned software architecture to fulfill particular requirements. Alternatively, all or part of the modules illustrated therein can be implemented by IC hardware components.

Figure 4:
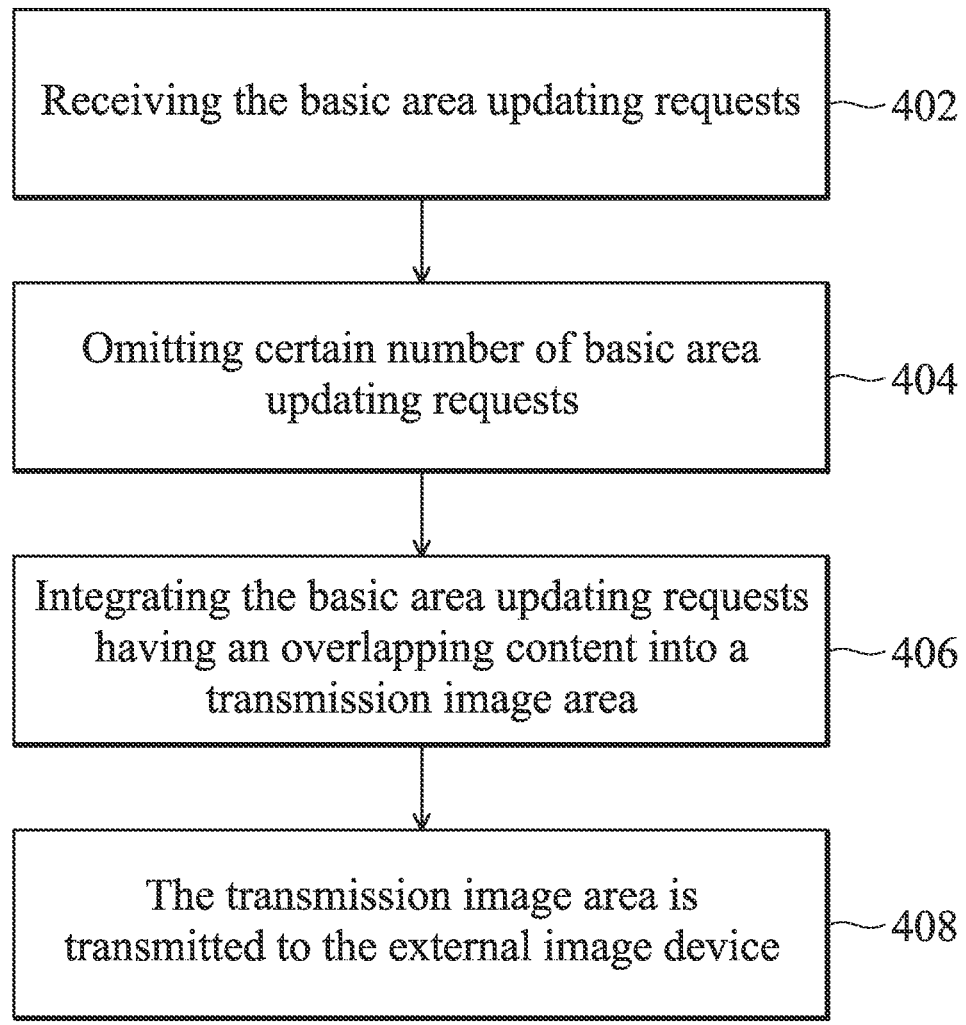
FIG. 4 is a timing diagram of an embodiment of the processing method of the invention.

FIG. 4 is a flowchart of a processing method of an external-image device according to the disclosure.

First, as shown in FIG. 3, the operating system calculates the number of image-updating areas, which needs to be updated, according to the operation of the user or the application program. These areas are usually the shape of rectangle for the efficiency of consideration, but they are not limited thereto.

In this embodiment, the operations of the user comprise using the mouse to drag the window or zoom the window in or out, drawing or inserting text in some area, and so on.

In this embodiment, the operations of the application program comprise the update requirements of the application program, or the update requirements of the image in a certain area according to the operation of a specific program.

In the following examples, the update requirements for updating an image from the operating system or other components are called the basic area-updating requests. In addition, each of the basic area-updating requests corresponds to an image-updating area. In other words, if the user moves the mouse to drag a window, the mouse-moving event may be triggered 20 times, and then the operating system calculates how many image-updating areas need to be updated. For example, if the mouse-moving event involves three image-updating areas, it can be realized that three basic area-updating requests are generated.

In this embodiment, if the user uses the configuration as FIG. 1, the basic area-updating requests from the operation system are received by the driver corresponding to the external video adaptor 108 (step 402). The driver is performed by the computer of FIG. 1, and usually sold to users with the external video adaptor 108. Users install the driver to use an external video adaptor. Another case is that the operating system has a built-in driver, or is implemented as part of the operating system (is not particularly known as the driver), but should be considered as having the same concept as the following embodiments.

Additionally, if the external display 102 of FIG. 1 needs to update the screen frame corresponding to the operation of the mouse, the computer 104 should provide the corresponding data to the external video adaptor 108. If the transmission rate between the external video adaptor 108 and the computer 104 is fast enough; theoretically, it just needs to transmit these basic area-updating requests to the external video adaptor 108. The transmission rate is insufficient when the external video adaptor 108 transmits the basic area-updating requests through the slower external interface having a limited or lower data transmitting rate (i.e. USB 1.0, USB 2.0, WiFi). The transmission rate is also insufficient even using the faster USB 3.0 or other faster transmission interface when the same external interface has some other transmission requirements besides the external display 102. If the transmission rate is insufficient, it may cause an apparent image updating delay and may lead the user to feel uneasy and irritable if all of the basic area-updating requests are required to be processed.

Therefore, the driver analyses these basic area-updating requests in a batch, and calculates the corresponding transmission-image area(s). During the analysis process, the driver can directly omit a certain number of basic area-updating requests (step 404). For example, if a basic area-updating request corresponds to an image-updating area which will be displayed on the display for a short time period and then will be replaced by another image in a predetermined period, then this basic area-updating request can be directly omitted. For example, when the color of an area is required to be updated in a gradually fading manner, and it needs 1000 times updating in order to generate a smooth fading effect. Even if half of the updating numbers are omitted, a certain degree of smoothness can still be retained and half of the amount of data transmission is immediately saved. In this way, although the updating of the corresponding image-updating area is better to be seen by the users, with a limited transmitting rate, omitting this content can bring a relatively smooth image-updating effect. Thus, it is a worthy design option.

In addition, the driver calculates the image-updating areas corresponding to the multiple basic area-updating requests to determine whether some updating of sub-areas in the image-updating areas can be omitted if all of the updates are performed. These sub-areas can also be omitted without further transmitting to the external video adaptor 108.

Besides the drive omitting these contents which can be omitted, the driver also integrates the basic area-updating requests having (corresponding to) overlapping content into a transmission-image area (step 406). For example, a user may drag a window by the mouse and this action may trigger 100 times mouse-moving events. The operating system then generates 100 basic area-updating requests to the driver and all of these requests may only take 10 milliseconds. In this case, the driver can set a predetermined period of time (i.e., 1 ms), and the 100 basic area-updating requests will be divided into 10 groups. Each group of the basic updating requests is cumulatively calculated by the driver, and the driver only transmits the result of the cumulated calculation in each of the predetermined period to the external video adaptor 108.

In other words, through such an approach, the original transmitting of 100 basic area-updating requests corresponding to the updated image can be replaced by only 10 times of integrated image-updating area transmitting. Due to the integration, the driver also requires a certain time period for computing. The driver thus refers to the change-perceiving ability of the human eye and the transmission rate of the external interface to integrate the basic area-updating requests of the first number to the transmission-image area of the second number. Typically, if the first number is greater than the second number, it represents a certain percentage of saving for data transmission.

In the example of FIG. 1, the percentage between the first number and the second number is decided by the transmission rate of the external interface and the characteristics of the external display 102 connected by the external video adaptor 108. For example, the same external video adaptor 108 can be connected to the external display 102 with different specifications. If the external video adaptor 108 and the external display 102 are connected through the HDMI transmission interface, the parameter of the external display 102 (i.e. the number of updated images per second) can be obtained by the external video adaptor 108. The result will not be significantly changed even using a higher integrated ratio, when the external display 102 does not support the fast image updated rate. However, the data transmission between the external video adaptor 108 and the computer 104 will be prominently reduced.

In addition, the driver provides a setting interface to allow the user to set the ratio between the first number and the second number and to determine the degree of integration.

After the operation of omitting update content, the request for transmitting the updated image is significantly reduced. Then, the updated image (i.e., the transmission-image area) is transmitted to the external-image device (the external video adaptor 108 of FIG. 1) (step 408).

Before transmitting the data of the image-updating areas to the external display 102, the transmitted data can be sent to the display memory of the external display 102 (i.e. frame buffer). In this way, the external display 102 is able to directly update the image content. Another method is when these transmission-image areas are sent to the external display 102, the transmission-image area will be sent to an off-screen memory of the external display 102. Then, the external display 102 updates the stored data in the off-screen memory to a display the image at the appropriate time.

The method of writing the transmission data to the off-screen memory is particularly useful while using a USB transmitting protocol and the method will be clearly illustrated in the following.

The above provides an effective processing method of an external-image device. With this method, an effective external-image device can be provided.

Next, there are more figures to clearly illustrate the above embodiments and introduce some other embodiments.

Figure 5A:
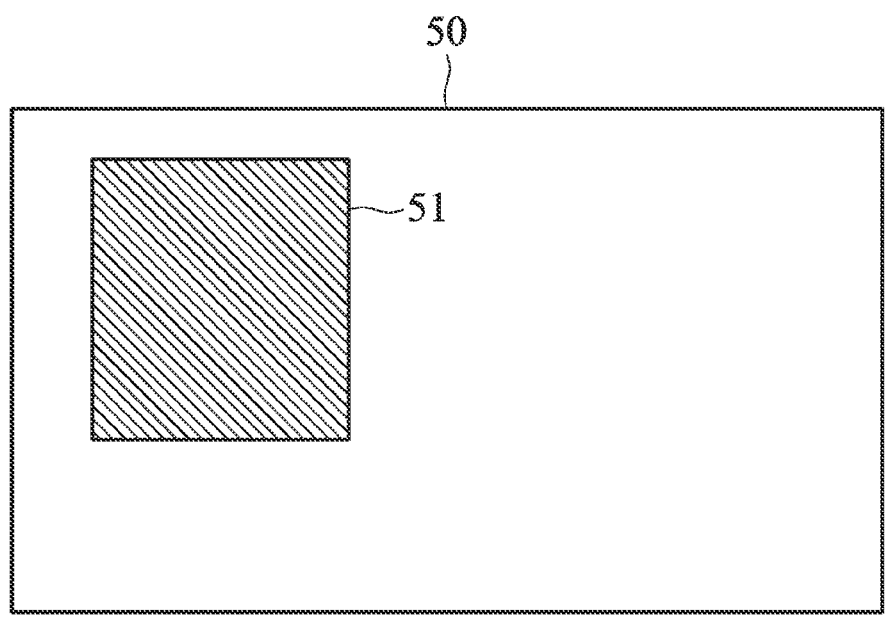
FIG. 5A is a diagram of an embodiment of the basic area-updating requests of the invention.
Figure 5B:
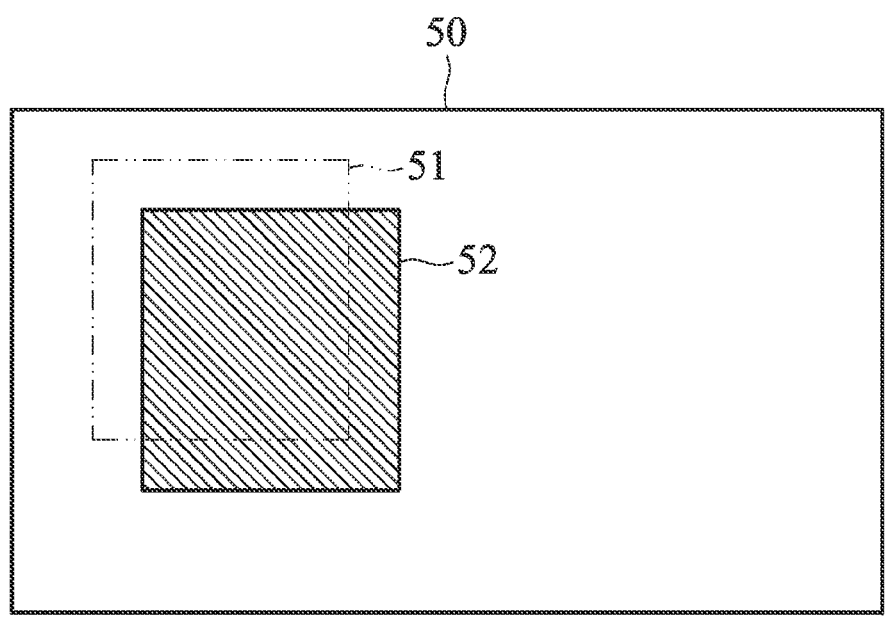
FIG. 5B is a diagram of another embodiment of the basic area-updating requests of the invention.
Figure 5C:
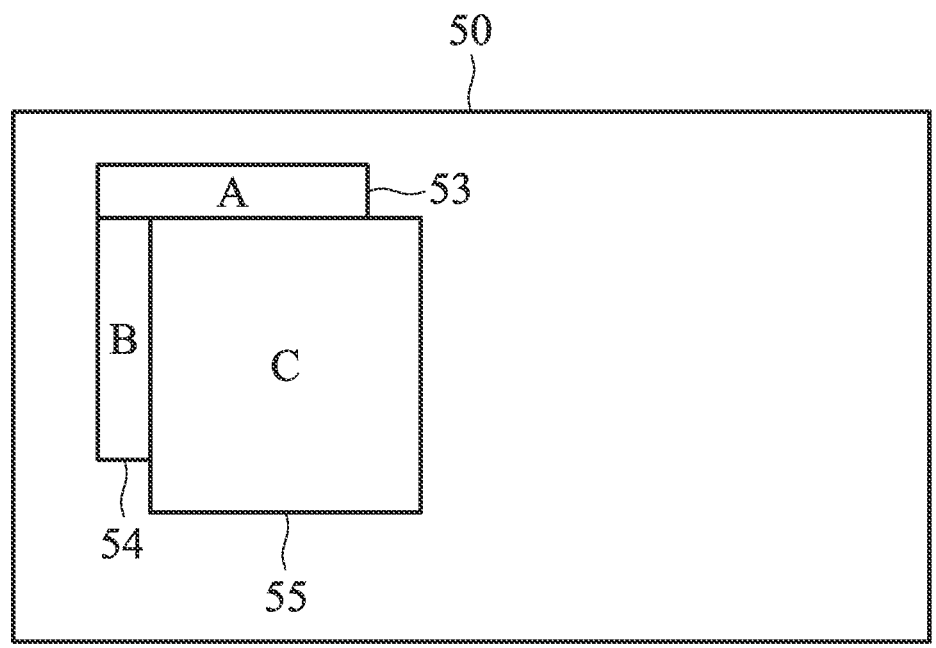
FIG. 5C is a diagram of another embodiment of the basic area-updating requests of the invention.

Referring to FIGS. 5A, 5B and 5C, these three figures are the embodiments of a basic area-updating request.

These embodiments of the three figures illustrate the method wherein the user drags a window 51 to a location 52 with a mouse, and the operating system performs a calculation to obtain three basic area-updating requests corresponding to three image-updating areas A, B and C (53, 54 and 55).

Figure 6:
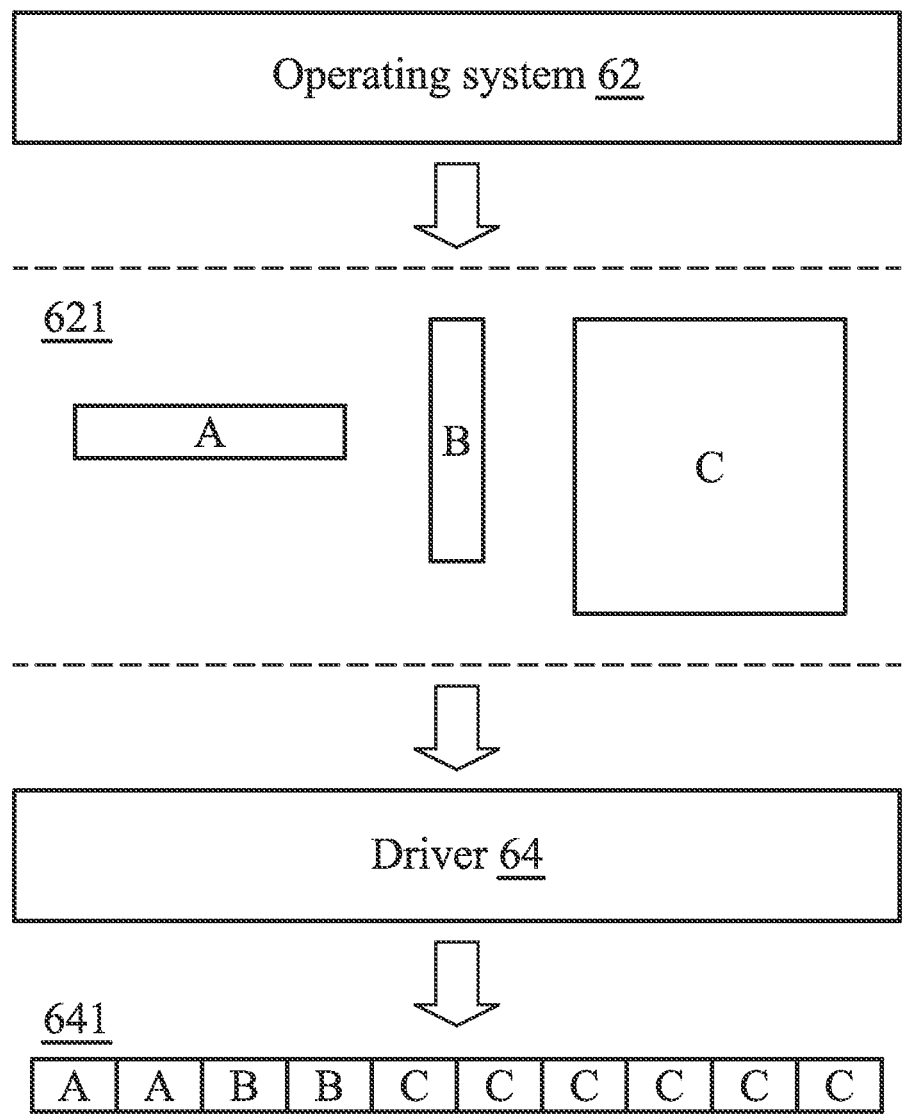
FIG. 6 is a diagram of an embodiment of the basic area-updating requests and the transmission-image area of the invention.

Referring to FIG. 6, after the operating system 62 obtains the three basic area-updating requests 621, the operating system then sends the three basic area-updating requests 621 to the driver 64. The driver 64 processes the three basic area-updating requests 621 to generate the corresponding transmission-image areas A, B, C and sends the data of the transmission-image areas A, B and C to the external display 102 through the external interface (i.e., USB interface).

If the basic area-updating requests cannot be omitted or integrated through the analysis, the driver will transmit the data of the transmission-image areas A, B and C to the external-image device. However, if any basic area-updating request which can be omitted is found after the analysis, it will be omitted immediately.

In addition to the situation of the color-fading at the same area, a certain percentage of basic area-updating requests can be omitted. However, a certain percentage of basic area-updating requests also can be omitted when the updating area is changed.

Figure 7:
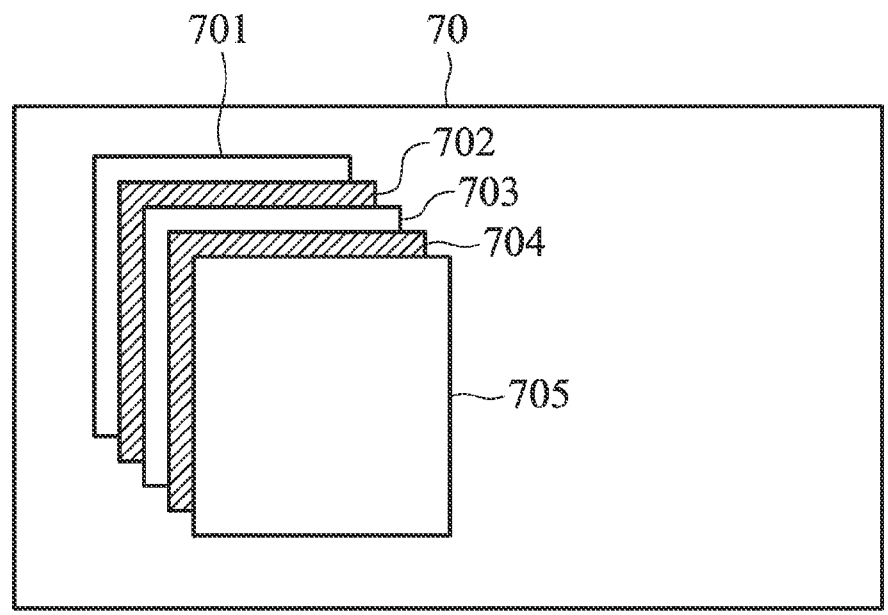
FIG. 7 is a diagram showing an embodiment of the basic area-updating requests which are omitted.

FIG. 7 illustrates the embodiment having a plurality of basic area-updating requests in a predetermined period. In this embodiment, the window in the area 701 is dragged successively through areas 702, 703, 704, and 705 in a predetermined period. If the background color is fixed, when the basic area-updating requests corresponding to areas 702 and 704 are directly omitted and only the basic area-updating requests corresponding to areas 701, 703, and 705 are sent, the amount of data transmitting can be successfully reduced by 40%.

Figure 8A:
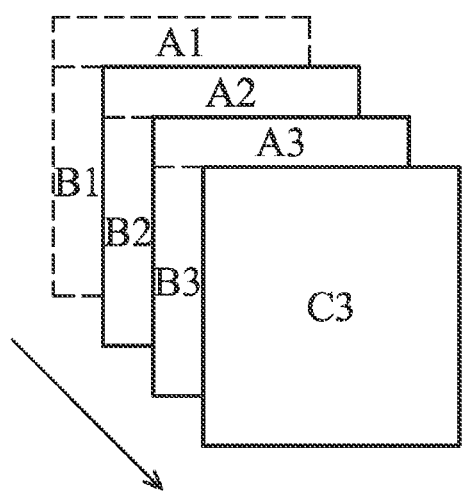
FIG. 8A is a diagram showing an embodiment of the steps of the basic area-updating requests of the invention.
Figure 8B:
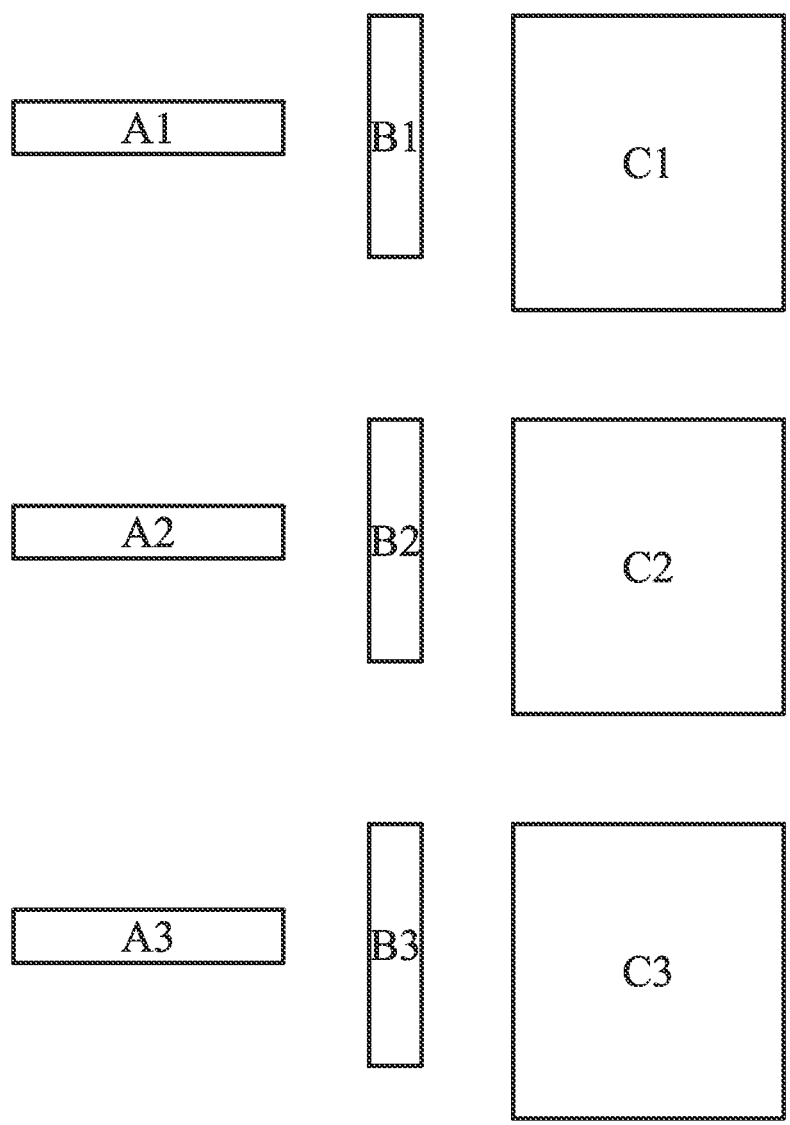
FIG. 8B is another diagram showing an embodiment of the steps of the basic area-updating requests of the invention.

Then, please refer to FIG. 8A and FIG. 8B. These two figures assume that the two areas of five basic area-updating requests are omitted, and three areas are still left to be processed. As shown in FIG. 5C and the above descriptions, the three updating areas of FIG. 8A correspond to the nine basic area-updating requests in this embodiment.

Figure 9A:
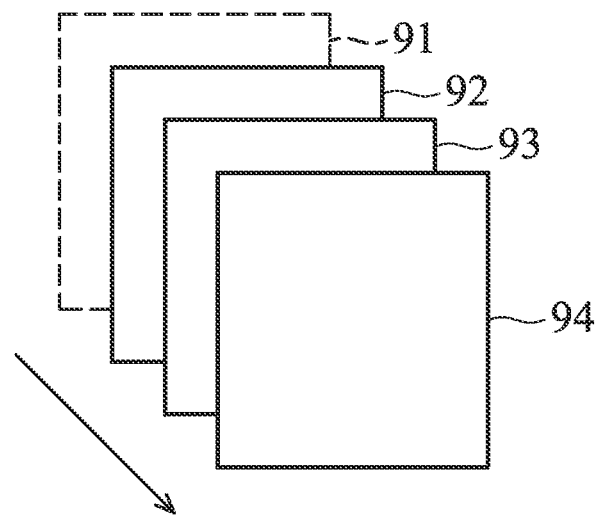
FIG. 9A is a diagram of another embodiment of the method of integrating multiple updating areas of the invention.
Figure 9B:
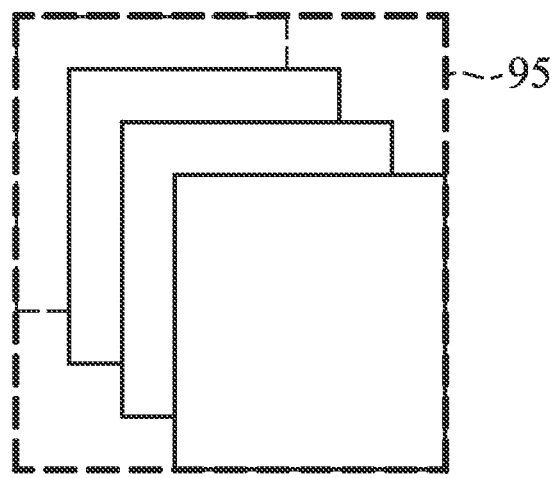
FIG. 9B is another diagram of another embodiment of the method of integrating multiple updating areas of the invention.

Please refer to FIG. 9A and FIG. 9B illustrating a method of integrating multiple image-updating areas into one. As shown in FIG. 9A, the window is dragged in sequence from area 91 to image-updating areas 92, 93, and 94. If the driver detects that these three image-updating areas 92, 93, and 94 are generated in the same predetermined period (i.e., 10 milliseconds), the three image-updating areas 92, 93, and 94 are integrated into one area 95 by the driver.

In other words, the driver calculates the basic area-updating requests corresponding to image-updating areas 92, 93, and 94 to generate the updated result. Instead of directly transmitting the basic area-updating requests corresponding to image-updating areas 92, 93, and 94 to the external video adaptor, the image data of area 95 only needs to be sent one time after the basic area-updating requests are integrated. Therefore, the amount of data transmission is reduced, and the refresh rate is also improved.

Figure 10:
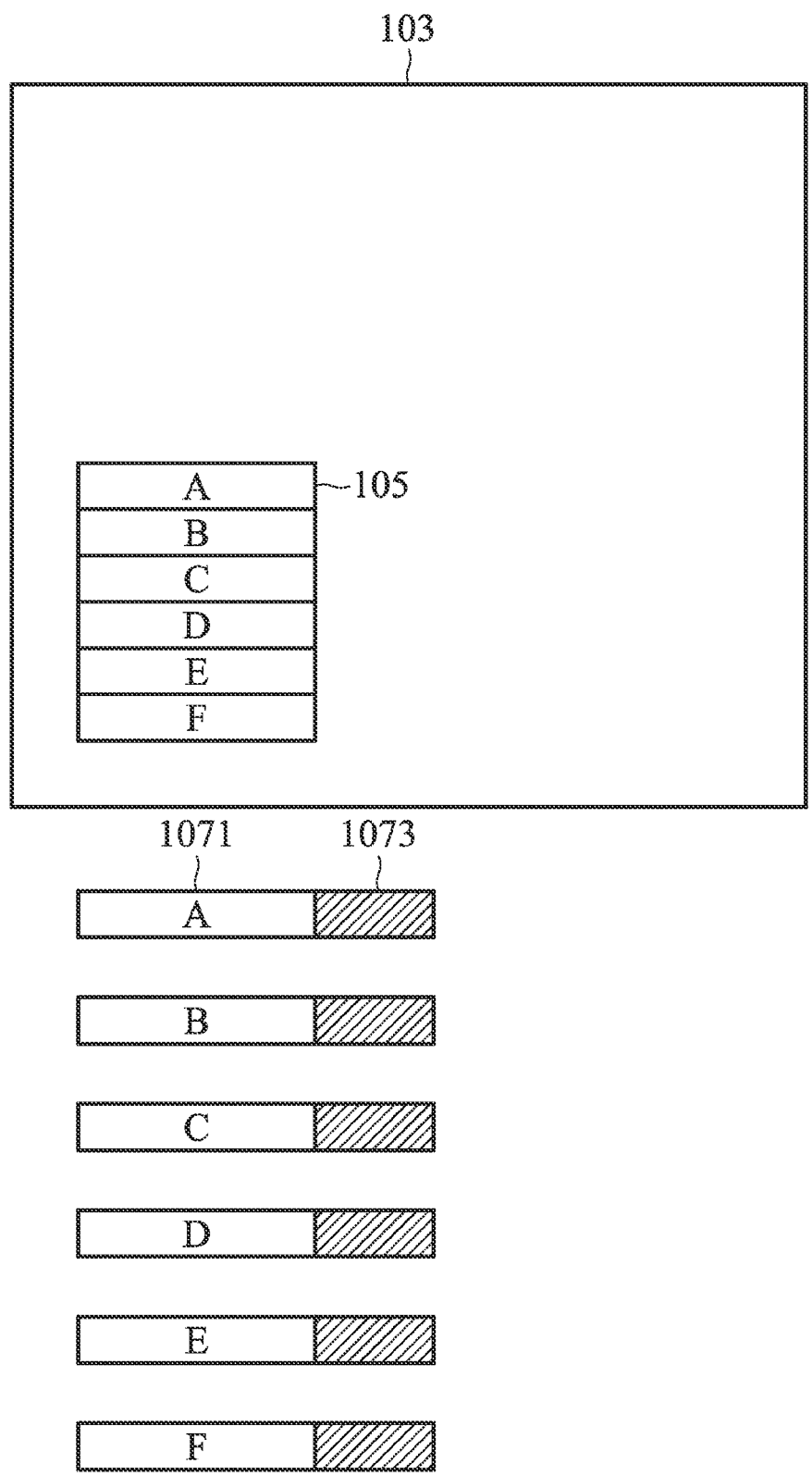
FIG. 10 is a diagram showing an embodiment of transmitting the update data of the invention.

Then, please refer to FIG. 10 illustrating the situation of transmitting the update data of the external interface (USB).

Assuming the updating area data 105 comprising six rows A, B, C, D, E, and F is required to be transmitted, and the updating area data 105 is required to be directly written to the display memory (such as a frame buffer) of the external-image device: If the amount of data of a row is 1000 units and the initial address of the first row A starts at 1200, the initial address of the second row B starts at 2200, the initial address of the third row C starts at 3200, the initial address of the fourth row D starts at 4200, the initial address of the fifth row E starts at 5200, and the initial address of the sixth row F starts at 6200.

Thus, although the six rows belong to the same image-updating area, they correspond to six independent data during the transmission. Further, if the data 105 is transmitted by the external interface such as USB, the basic data 1071 and the corresponding header 1073 are both transmitted during the transmission.

Figure 11:
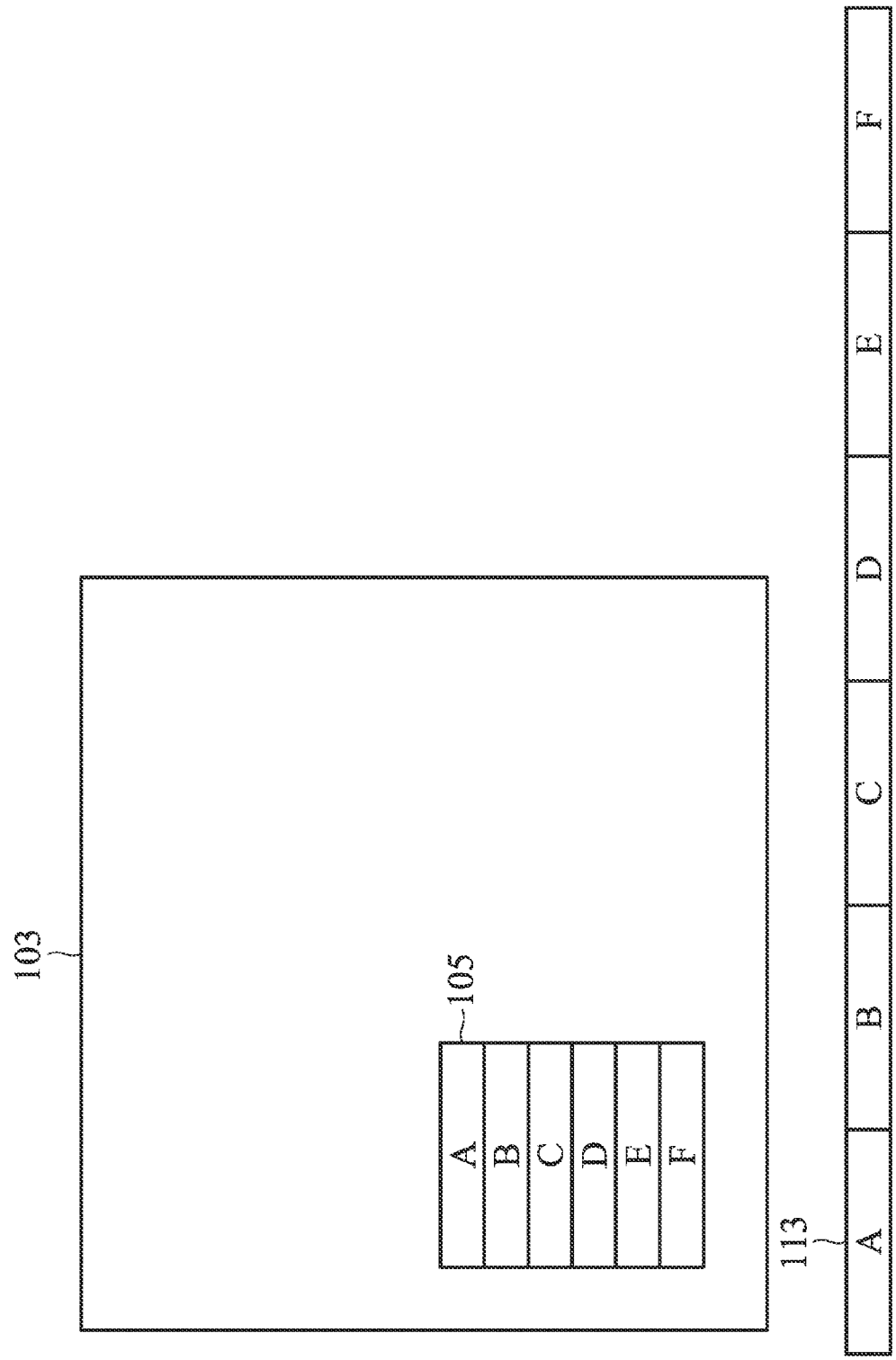
FIG. 11 is another diagram showing an embodiment of transmitting the update data of the invention.

FIG. 11 illustrates another method for transmitting updating data. The method applies the Bit Blit function or the corresponding function. Bit Blit is supported by most of the adapters, and the main purpose of the design is to operate the animation. Generally, in the animated operation, the different role patterns representing different actions are attached in sequence on a background. If the role pattern is directly written to the display memory (i.e., the frame buffer), the frame buffer will need to be updated until another role pattern is requested. Therefore, the role patterns are written to an off-screen memory, and through the Bit Blit instructions, the hardware of the adapter is allowed to read the corresponding role pattern from the off-screen memory, and update the role patterns to the corresponding frame buffer at the proper time. Since these operations are not processed by the processor, the efficiency is better than a normal updating method.

As shown in FIG. 1, most of the processing chips equipped in the external video adaptor 108 have the function of Bit Blit. Therefore, while transmitting the update data, the multiple rows of image updating data can be sent to the off-screen memory of the external-image device as a whole, and then the corresponding Bit Blit command is sent to the external-image device.

In FIG. 11, the six rows A, B, C, D, E and F of the image updating data are packaged together and sent to the off-screen memory 113 of the external-image device. In other words, this transmission method omits the headers shown in FIG. 10 and it only takes one transmission instance. When the data is transmitted to the external-image device by USB interface in patches, it would take a lot of time because it will take extraneous time for the device communication and transmission of the header in each patch. On the contrary, this method saves a lot of time because the headers shown in FIG. 10 are omitted and only one transmission is taken.

Figure 12:
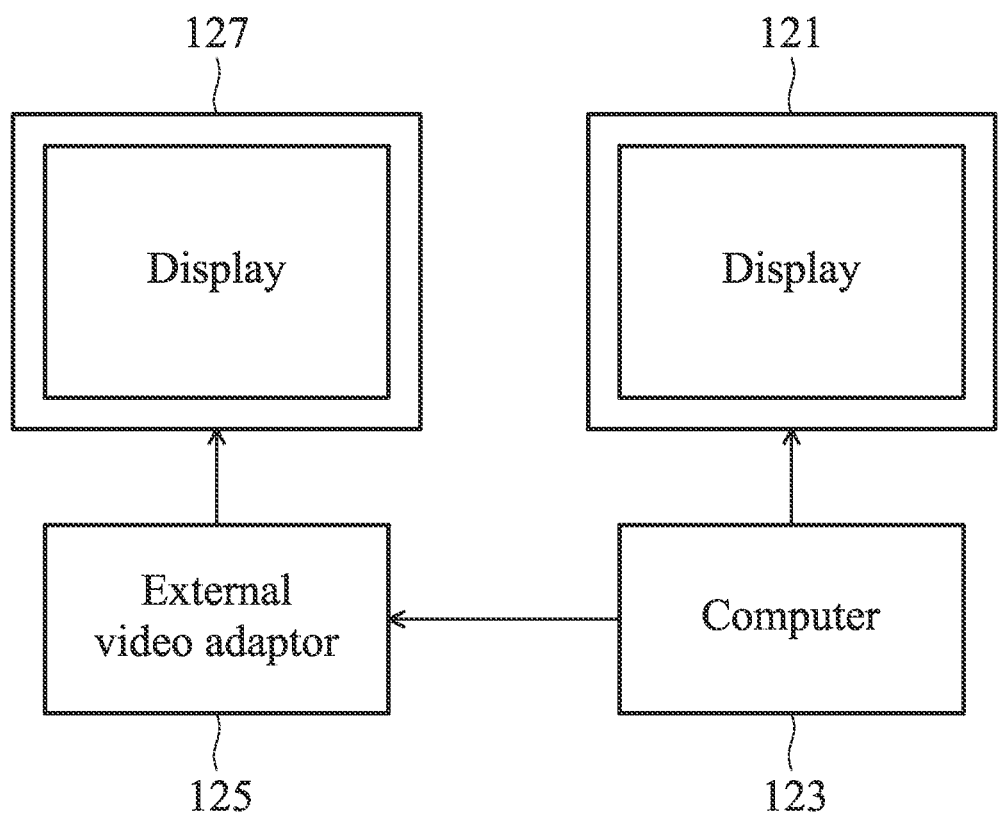
FIG. 12 is another diagram showing an embodiment of the external-image device of the invention.
Figure 13:
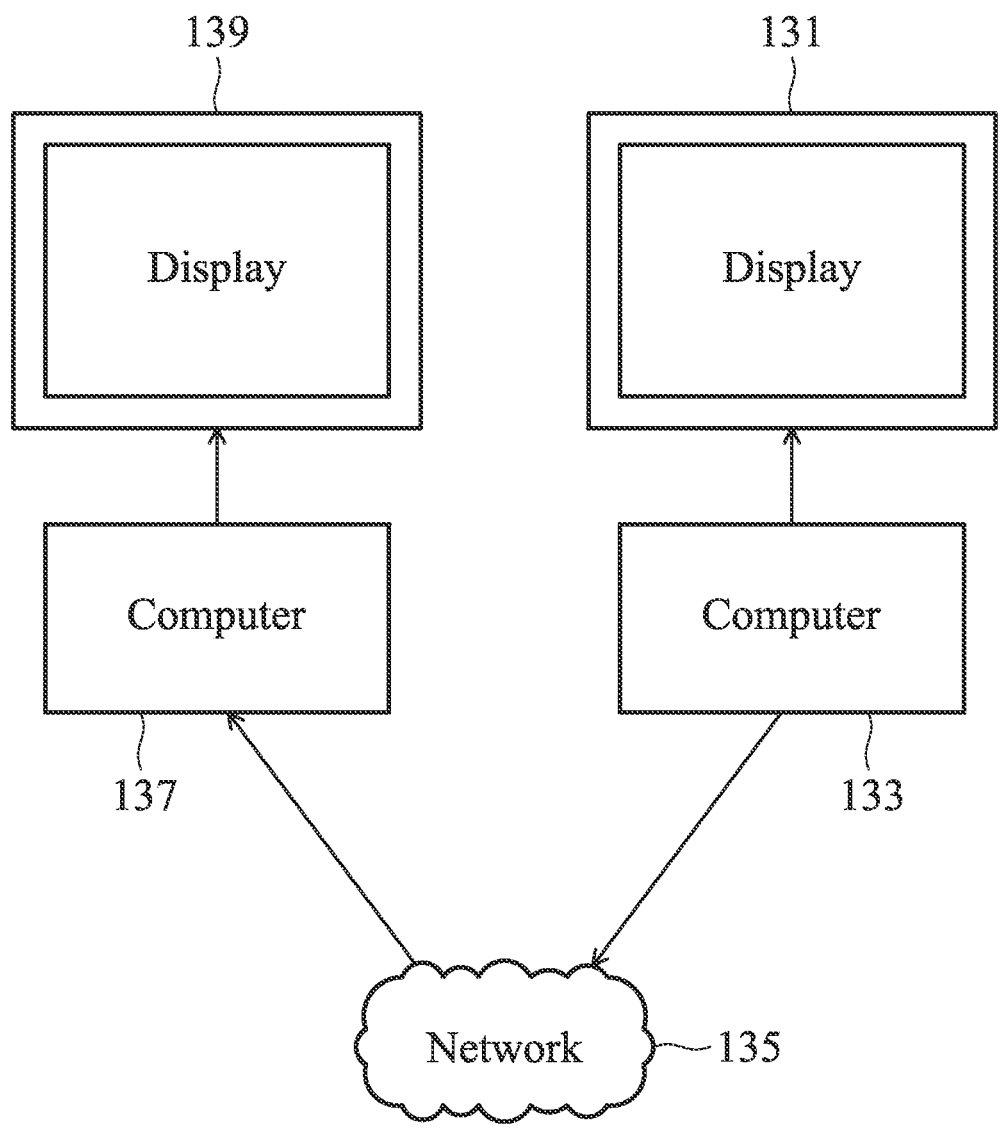
FIG. 13 is another diagram showing an embodiment of the external-image device of the invention.
Figure 14:
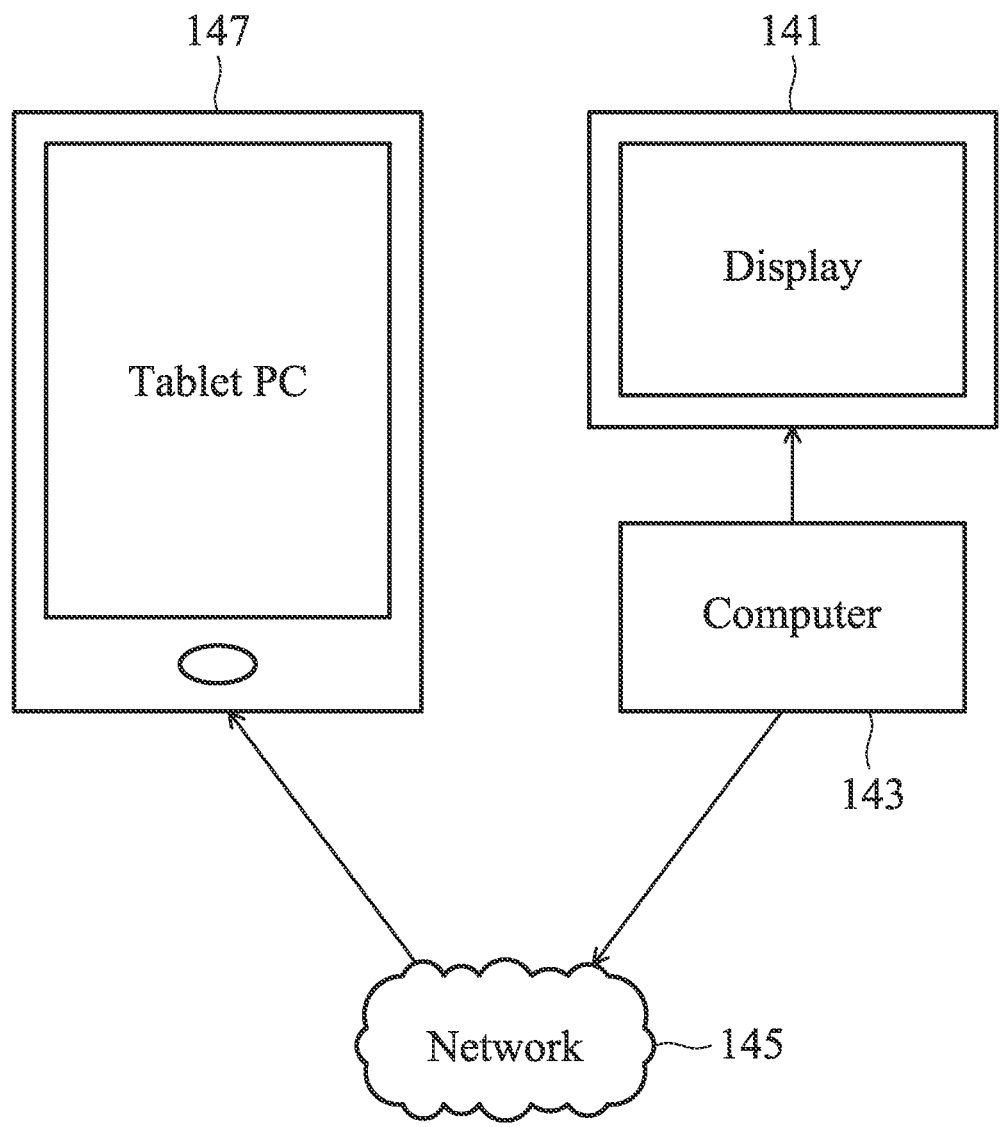
FIG. 14 is another diagram showing an embodiment of the external-image device of the invention.

Next, please refer to FIG. 12, FIG. 13 and FIG. 14 illustrating three possible variation of the embodiment.

As shown in FIG. 12, the computer 123 displays not only on the display 121, but also on the display 127 through the external video adaptor 125. The screen of the display 123 can be set as the same as the display 127. Furthermore, the display 127 can be set as an extension of the display 121.

According to the descriptions above, one with ordinary skills in the art should realize how to perform the application of image update, and thus the details thereof are omitted for brevity.

As shown in FIG. 13, the computer 133 is connected to the display 131. Computer 137 is connected to computer 133 through network 135, and displays the same content as in the display 131 and the display 139. This application can be used in the remote desktop as well. In this case, the update command of the driver can be installed inside computer 133. Thus, when the update image of display 131 is sent to a remote computer 137, the omitted and integrated method is suggested. First, analyze the basic area-updating requests sent to the external-image device for reducing the amount of data transmission. Then, the Bit Blit command is used for transmitting the data efficiently. Through this approach, the screen update fluency hopefully can be smoother despite the limited network bandwidth.

As shown in FIG. 14, the tablet PC 147 is connected to the computer 143 through a network 145 such that the screen of tablet 147 displays the same content with display A141. Similar to the descriptions above, the method of processing the external-image device can also be written as the command to be installed in the computer A143 so that the operation of the image update is performed smoother.

Figure 15:
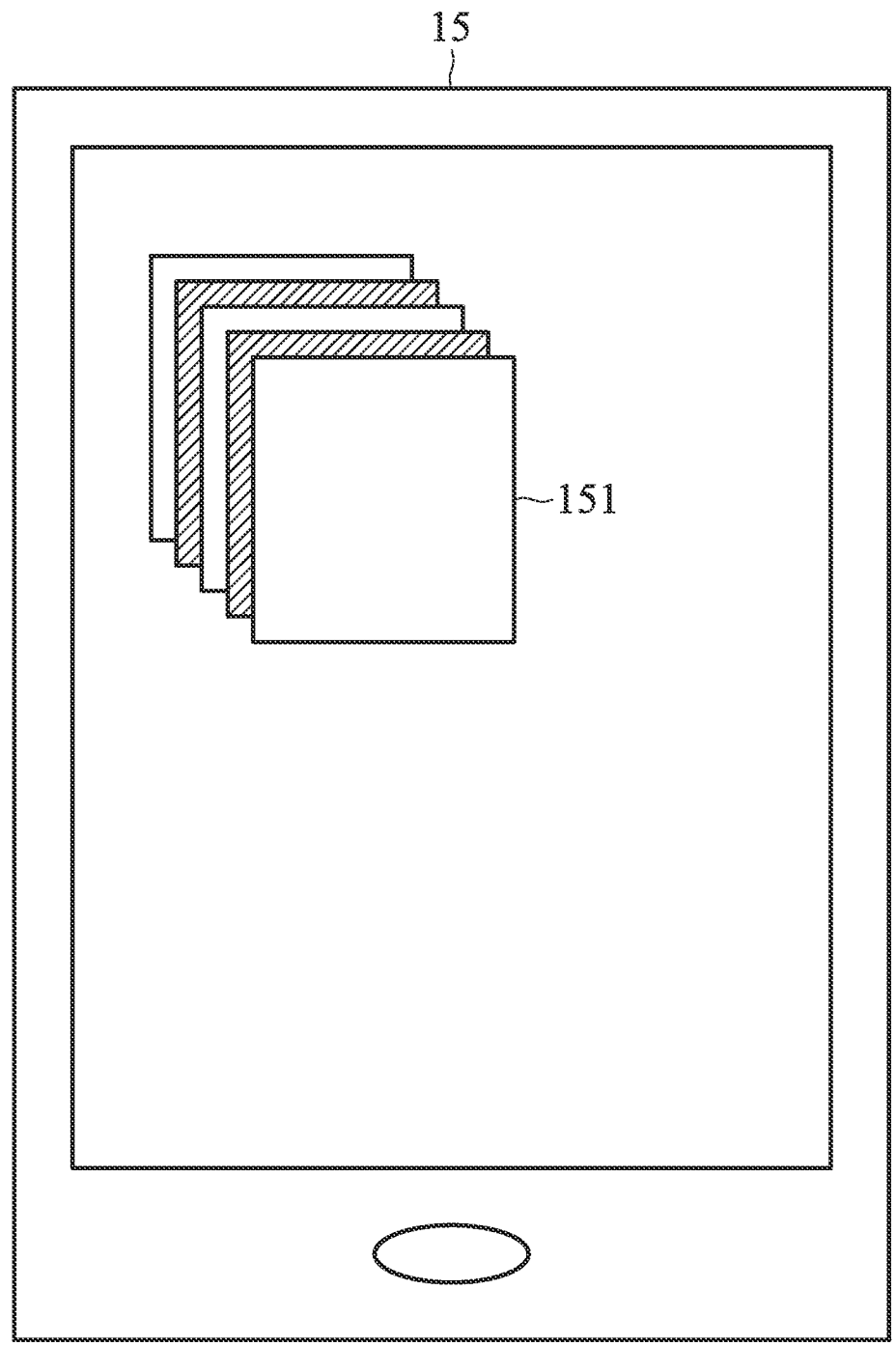
FIG. 15 is another diagram showing an embodiment of the external-image device of the invention.

The external-image device can be integrated into the electronic device. In FIG. 15, when image updating is required in a tablet PC, the frame data to be updated can be integrated through the aforementioned methods to perform data updating with reduced amounts of data.

For the purpose of using electronic ink or time-saving, such an approach can achieve certain benefits. As for what level of integration, for example, the ratio between the first number and the second number can be self-adjusted according to the characteristics of the display or set with the interface by the user.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A processing method of an electrical device, comprising:
   receiving a first number of basic area-updating requests generated by an operating system of the electrical device, by a processor circuit operating in the electrical device, wherein each of the basic area-updating requests corresponds to an image-updating area, and the first number of basic area-updating requests correspond to an updating contents of a displayed image;
   calculating the image-updating areas corresponding to the first number of basic area-updating requests by the processor circuit;
   using a transmission rate of an external interface to determine a ratio of the first number corresponding to the basic area-updating requests and a second number corresponding to transmission-image areas by the processor circuit;
   integrating the image-updating areas to the second number of the transmission-image areas according to the ratio to reduce an amount of data transmission between an external-image device and the electronic device by the processor circuit, wherein a screen update fluency of the external-image device is smoother when a network bandwidth between the external-image device and the electrical device is limited; and
   transmitting the second number of transmission-image areas to the external-image device through the external interface by the processor circuit.

2. The processing method as claimed in claim 1, wherein at least two of the basic area-updating requests are integrated into a corresponding request for one of the transmission-image areas and one of the transmission-image areas is a part of the updating content of the displayed image and is obtained from the corresponding request.

3. The processing method as claimed in claim 1, wherein the displayed image is transmitted to the external-image device through the external interface by the processor circuit.

4. The processing method as claimed in claim 1, further comprising:
setting a predetermined period; and
integrating the basic area-updating requests corresponding to the predetermined period to obtain the transmission-image areas.

5. The processing method as claimed in claim 1, further comprising:
transmitting the transmission-image areas to an external memory of the external-image device; and
accessing content of the transmission-image areas by the external-image device to update corresponding areas of the displayed image.

6. The processing method as claimed in claim 1, wherein the transmission-image areas are operated by Bit Blit commands.

7. A system, comprising:
an electrical device, comprising a processor arranged to:
receive a first number of basic area-updating requests generated by an operating system of the electrical device, wherein each of the basic area-updating requests corresponds to an image-updating area, and the first number of basic area-updating requests correspond to an updating contents of a displayed image;
calculate the image-updating areas corresponding to the first number of basic area-updating requests;
use a transmission rate of an external interface to determine a ratio of the first number corresponding to the basic area-updating requests and a second number corresponding to transmission-image areas;
integrate the image-updating areas to the second number of the transmission-image areas according to the ratio to reduce an amount of data transmission between an external-image device and the electronic device; and
transmit the second number of transmission-image areas to the external-image device through the external interface; and
a display, connected to the electrical device through the external interface and receiving the transmission-image areas, wherein a screen update fluency of the external-image device is smoother when a network bandwidth between the external-image device and the electrical device is limited.

8. The external-image device as claimed in claim 7, wherein the updating content of the displayed image is displayed by the display after the external-image device receives the transmission-image areas.

* * * * *